(12) United States Patent
Liang

(10) Patent No.: US 8,423,099 B2
(45) Date of Patent: Apr. 16, 2013

(54) ROTATING MECHANISM AND ELECTRONIC DEVICE USING SAME

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 363 days.

(21) Appl. No.: 12/862,859

(22) Filed: Aug. 25, 2010

(65) Prior Publication Data

US 2011/0287816 A1    Nov. 24, 2011

(30) Foreign Application Priority Data

May 20, 2010    (CN) .......................... 2010 1 0178573

(51) Int. Cl.
  *H04M 1/00*    (2006.01)
  *F16H 21/44*    (2006.01)
  *E05D 11/06*    (2006.01)
  *E05D 15/06*    (2006.01)

(52) U.S. Cl.
  USPC ............... 455/575.4; 455/575.1; 74/100.1; 16/359; 16/360; 16/361; 16/376

(58) Field of Classification Search .... 455/575.1–575.4, 455/550.1; 16/359, 360, 361, 376, 377, 381, 16/384, 386; 361/679.01, 379.56; 74/100.1
  See application file for complete search history.

(56) References Cited

U.S. PATENT DOCUMENTS

| | | | | |
|---|---|---|---|---|
| 7,546,150 | B2 * | 6/2009 | Makino | 455/575.1 |
| 7,752,712 | B2 * | 7/2010 | Chuan | 16/358 |
| 7,779,509 | B2 * | 8/2010 | Jian | 16/359 |
| 8,250,712 | B2 * | 8/2012 | Kim et al. | 16/367 |
| 2008/0242380 | A1 * | 10/2008 | Kajihara et al. | 455/575.4 |

* cited by examiner

*Primary Examiner* — Wesley Kim
(74) *Attorney, Agent, or Firm* — Altis Law Group, Inc.

(57) ABSTRACT

A rotating mechanism, comprises a retaining plate having a cut-out defined therethrough, the cut-out being curved; a rotating plate being capable of rotating in a plane parallel to the plane of the retaining plate by a shaft; a pin slidably engaging with the cut-out and retained on the rotating plate; and a guiding assembly is coupled between the rotating plate and the retaining plate to guide the rotating plate to rotate relative to the retaining plate.

11 Claims, 5 Drawing Sheets

ROTATING MECHANISM AND ELECTRONIC DEVICE USING SAME

CROSS-REFERENCE TO RELATED APPLICATIONS

This application is related to co-pending U.S. patent application Ser. Nos. (12/862,858, 12/862,860 AND 12/862,861), entitled "ROTATING MECHANISM AND ELECTRONIC DEVICE USING SAME", by Liang Shi-Xu. These applications have the same assignee as the present application and have been concurrently filed herewith. The above-identified applications are incorporated herein by reference.

BACKGROUND

1. Technical Field

This disclosure relates to rotating mechanisms, particularly to rotating mechanisms used in an electronic device.

2. Description of Related Art

A typical portable electronic device, such as a mobile phone, generally includes a lower element and an upper element with a display mounted thereon. However, many conventional electronic devices use complicated components and methods to enable relative rotation between the upper and lower elements.

Therefore, there is a room for improved in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary rotating mechanism for electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
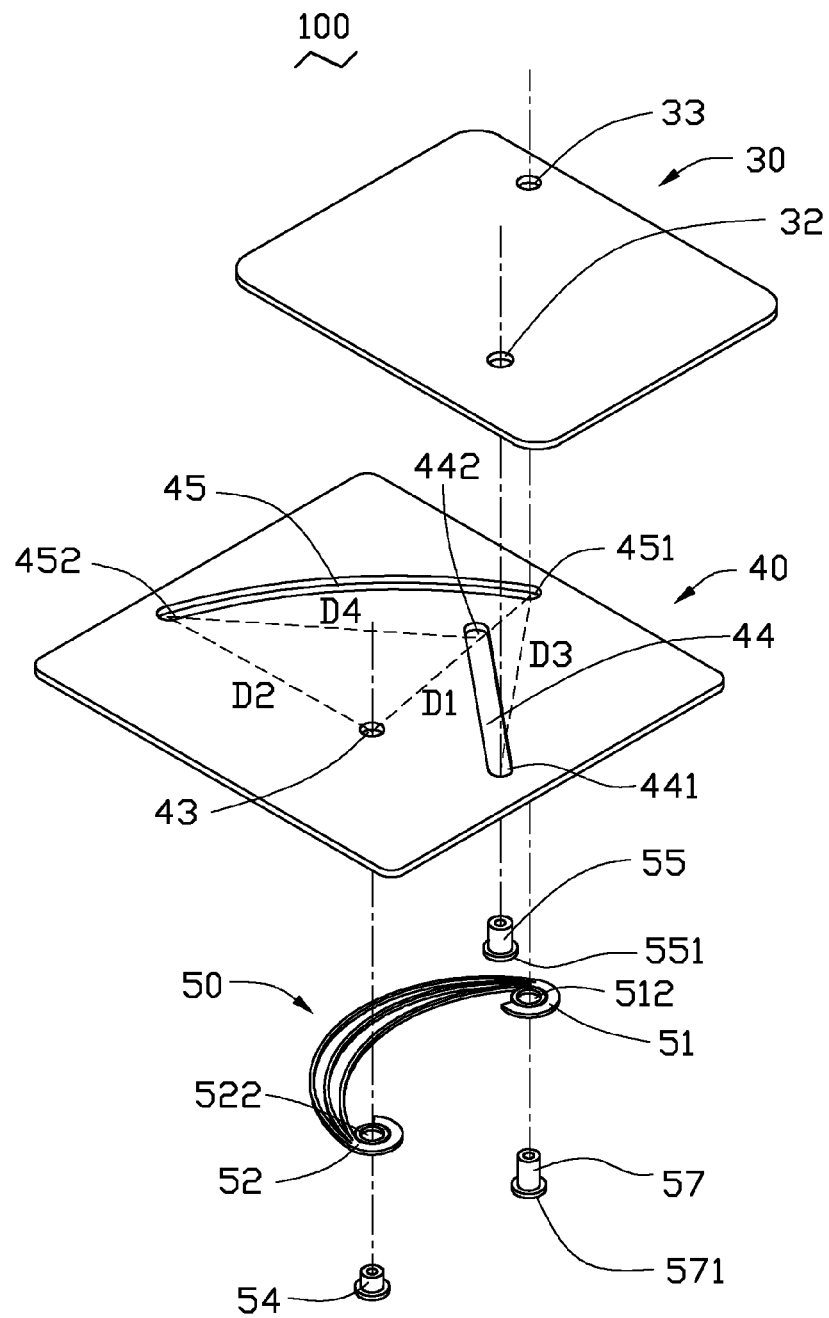
FIG. 1 is an exploded view of an exemplary embodiment of a rotating mechanism.
Figure 2:
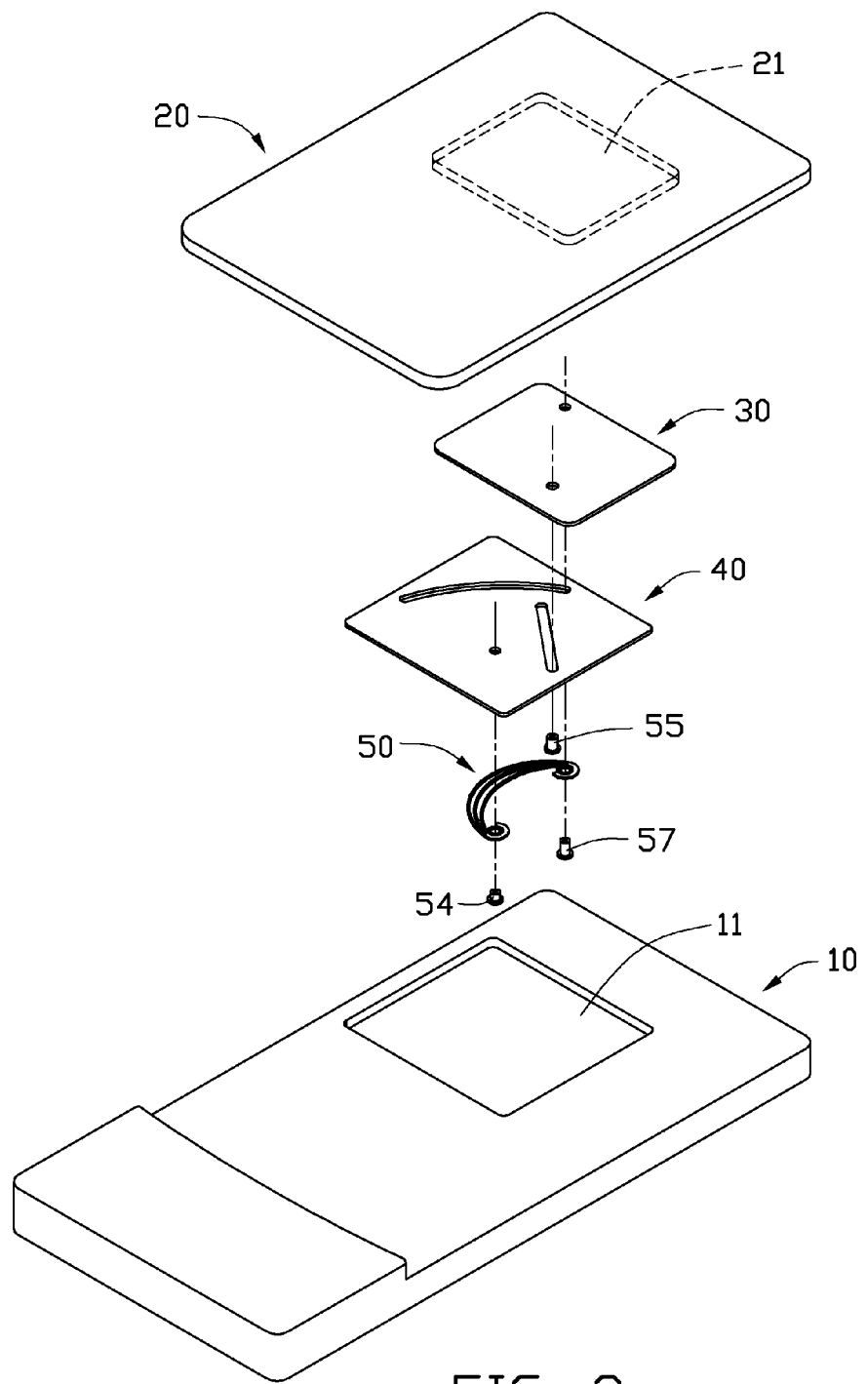
FIG. 2 is an exploded view of an electronic device using the rotating mechanism shown in FIG. 1.

FIG. 1 illustrates an exploded view of an exemplary rotating mechanism 100. FIG. 2 illustrates an exploded view of an electronic device (not labeled) using the rotating mechanism 100 shown in FIG. 1. The electronic device includes an upper housing 20 and a lower housing 10, which are connected by the rotating mechanism 100. The upper housing 20 defines a receptacle 21 facing the lower housing 10 and the lower housing 10 defines a compartment 11 facing to the receptacle 21. The receptacle 21 and the compartment 11 cooperatively accommodate the rotating mechanism 100.

The rotating mechanism 100 includes a retaining plate 40 and a rotating plate 30 which are rotatably coupled by a rotation enabling member (not labeled) as described below. The retaining plate 40 is mounted to the lower housing 10 and the rotating plate 30 is mounted to the upper housing 20 so the upper housing 20 can rotate with the rotating plate 30 relative to the lower housing 10 when the rotating plate 30 rotates relative to the retaining plate 40. The rotation enabling member is coupled between the retaining plate 40 and the rotating plate 30 so the rotating plate 30 rotatably engages with the retaining plate 40. The rotation enabling member, in this exemplary embodiment, comprises a pin 57, a cut-out 45 that engages the pin 57 and shaft 54. The pin 57 is retained on or rotatably affixed to the rotating plate 30 and extends into the cut-out 45. In this exemplary embodiment, the pin 57 is retained in a retaining hole 33 defined in the rotating plate 30. A distal end 571 of the pin 57 is wider than the cut-out 45 so the pin 57 cannot disengage from the cut-out 45 when the pin 57 passes through the cut-out 45 thereby retaining the rotating plate 30 to the retaining plate 40. Thus, as the rotating plate 30 rotates in a plane parallel to the plane of the retaining plate 40, the pin 57/cut-out 45 combination prevent the separation of the rotating plate 30 and the retaining plate 40. In this exemplary embodiment, the cut-out 45 is an curved groove defined in the retaining plate 40, including a first cut-out end 451 and a second cut-out end 452.

The shaft 54 is retained on or rotatably affixed to the rotating plate 30 and rotatably engages with the retaining plate 40 so the rotating plate 30 can rotate about the shaft 54 relative to the retaining plate 40. In this exemplary embodiment, the shaft 54 is retained in a securing hole 32 defined in the rotating plate 30 and extends into a shaft hole 43 defined in the retaining plate 40, and the shaft 54 is slightly smaller than the shaft hole 43 so the shaft 54 can rotate in the shaft hole 43. A distal end of the shaft 54 is wider than the shaft hole 43 so the shaft 54 will not pass through the shaft hole 43 thereby retaining the rotating plate 30 to the retaining plate 40. As the rotating plate 30 rotates relative to the retaining plate 40, the shaft 54/shaft hole 43 combination prevent the separation of the rotating plate 30 and the retaining plate 40. The pin 57 slides from the first cut-out end 451 to the second cut-out end 452 when the rotating plate 30 rotates about the shaft 54 relative to the retaining plate 40 from a first position shown in FIG. 3 to an intermediate position shown in FIG. 4 and a third position shown in FIG. 5. In this exemplary embodiment, the shaft hole 43 is located at one side of the cut-out 45, and the distance D1 between the shaft hole 43 and the first cut-out end 451 is equal to the distance D2 between the shaft hole 43 and the second cut-out end 452.

Figure 3:
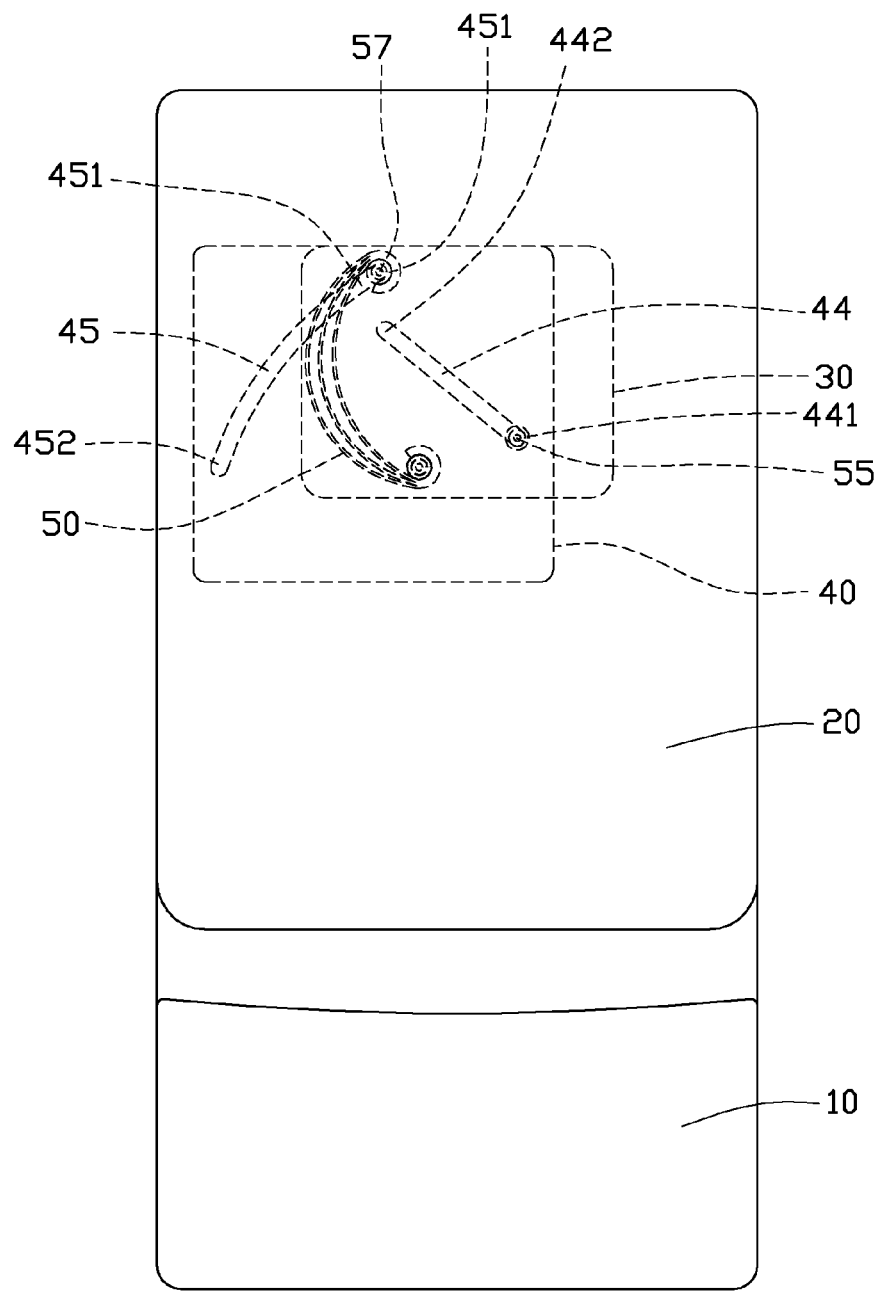
FIG. 3 is an assembled and partially perspective view of the electronic device in a first position.
Figure 4:
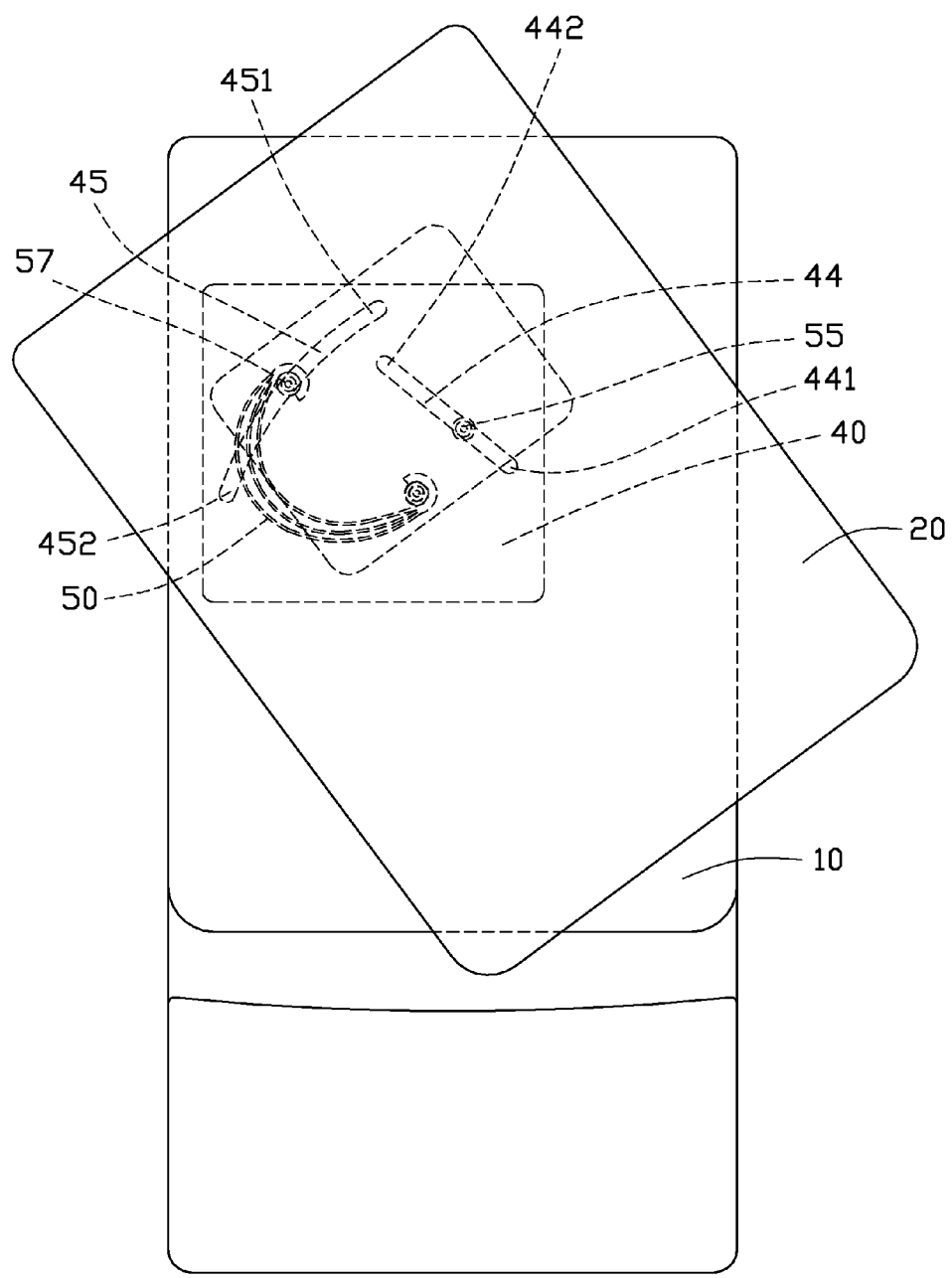
FIG. 4 is an assembled and partially perspective view of the electronic device in an intermediate position.

Referring to FIGS. 1 and 3, a biasing member 50 exerts a force on the pin 57 to cause the pin 57 to automatically slide relative to the cut-out 45. The biasing member 50 is coupled between the rotating plate 30 and the retaining plate 40. When the rotating plate 30 rotates from a first (e.g., the closed) position shown in FIG. 3 to the intermediate position shown in FIG. 4, the biasing member 50 is compressed to exert a force on the rotating plate 30 and the retaining plate 40; once the rotating plate 30 crosses the intermediate position shown in FIG. 4, the rotating plate 30 automatically rotates toward the rotated a third (e.g., open) position shown in FIG. 5 under the force of decompression of the biasing member 50. The biasing member 50 may be a spring, which has a first biasing member end 51 retained to the rotating plate 30 and a second biasing member end 52 retained to the retaining plate 40. The first biasing member end 51 defines a first latching hole 512, and the pin 57 inserts through the first latching hole 512 so the first biasing member end 51 retains to the rotating plate 30. The second biasing member end 52 defines a second latching hole 522, the shaft 54 is inserted in the second latching hole 522 so the second biasing member end 52 is retained to the retaining plate 40.

Referring to FIGS. 1 and 3-5, a guiding assembly (not labeled) is coupled between the rotating plate 30 and the retaining plate 40. The guiding assembly guides the rotating plate 30 to rotate relative to the retaining plate 40. The guiding assembly, in this exemplary embodiment, may include a guiding pole 55 and a guiding groove 44 that engages the guiding pole 55. The guiding pole 55 is positioned on the retaining plate 40 extending into the guiding groove 44. The guiding groove 44 is defined in the retaining plate 40 and includes a first guiding groove end 441 and a second guiding groove end 442 opposite to the first guiding groove end 441. The guiding pole 55 is retained in the securing hole 32 (introduced before) defined in the rotating plate 30, and a distal end 551 of the guiding pole 55 is wider than the guiding groove 44 so the guiding pole 55 will not pass through the guiding groove 44 thereby assisting the rotating plate 30 to retain to the retaining plate 40. When the rotating plate 30 rotates relative to retaining plate 40 between the first position shown in FIG. 3 and the third position shown in FIG. 5, the guiding pole 55 slides between the first guiding groove end 441 and the second guiding groove end 442. It is understood that one of ordinary skill in the art will appreciate that the guiding assembly that comprises the guiding pole 55 and the guiding groove 44 are only one example. It is also understood that the guiding pole 55 may be positioned on either the rotating plate 30 or the retaining plate 40 and the guiding pole 55 engaging member (e.g., guiding groove 44) may be defined in the element opposite to the guiding pole 55. In the exemplary embodiment, the distance D3 between the first guiding groove end 441 and the first cut-out end 451 is equal to the distance D4 between the second guiding groove end 442 and the second cut-out end 452.

Referring to FIGS. 1-3, in assembly, the first latching hole 512 is aligned with the first cut-out end 451 and the retaining hole 33, and then the pin 57 is inserted in the first latching hole 512, the first cut-out end 451 and the retaining hole 33 so the first biasing member end 51 is retained in the retaining hole 33 and the cut-out 45. The second latching hole 522 is aligned with the shaft hole 43, and then the shaft 54 is inserted in the second latching hole 522 and the shaft hole 43 to retain the second biasing member end 52 to the shaft hole 43. The first guiding groove end 441 is aligned with the securing hole 32, and then the guiding pole 55 is inserted in the first guiding groove end 441 and the securing hole 32 so the guiding pole 55 is extended in the guiding groove 44. Finally, the rotating plate 30 is retained in the receptacle 21 to mount the rotating plate 30 to the upper housing 20 and the retaining plate 40 is retained in the compartment 11 to mount the retaining plate 40 to the lower housing 10.

Figure 5:
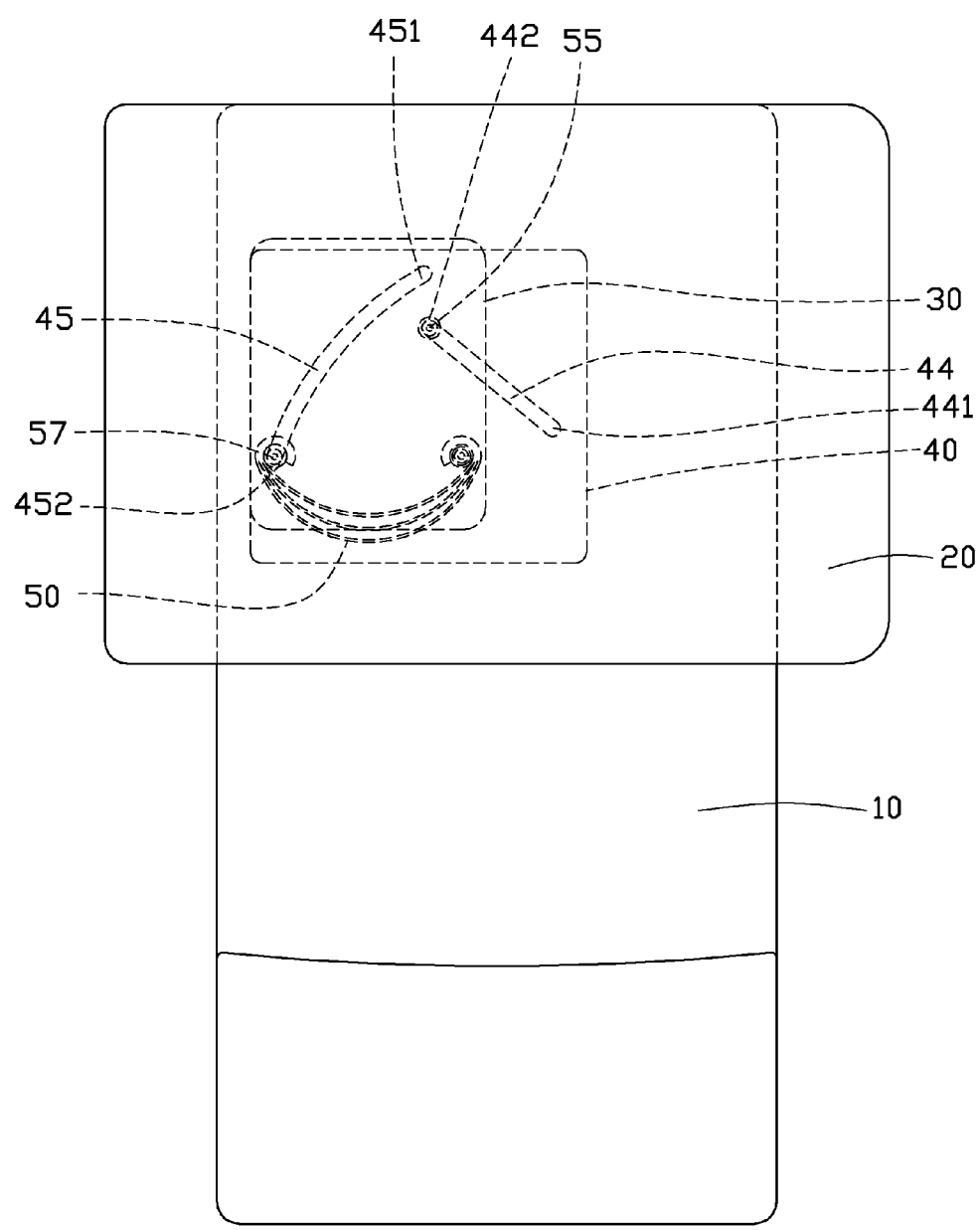
FIG. 5 is an assembled and partially perspective view of the electronic device in a third position.

Referring to FIGS. 3 and 5, in use, the upper housing 20 can rotates relative to the lower housing 10 by the rotating plate 30 rotates relative to the retaining plate 40. At this time, the pin 57 slides from the first cut-out end 451 toward the second cut-out end 452 and the biasing member 50 is compressed. When the pin 57 slides to and transitions to the intermediate portion of the cut-out 45, the biasing member 50 decompresses and the pin 57 automatically slides in the cut-out 45 to the second cut-out end 452 so the rotating plate 30 is automatically rotated about the shaft 54 relative to the retaining plate 40. Thus, the upper housing 20 is rotated relative to the lower housing 10 like shown in FIG. 5.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A rotating mechanism, comprising:
    a retaining plate having a curved cut-out defined therethrough, the cut-out comprising a first cut-out end and an opposite second cut-out end;
    a rotating plate being capable of rotating in a plane parallel to the plane of the retaining plate by a shaft;
    a pin slidably engaging with the cut-out and rotatably affixed to a hole on the rotating plate;
    a guiding assembly coupled between the rotating plate and the retaining plate to guide the rotating plate to rotate relative to the retaining plate;
    wherein the guiding assembly comprises a guiding pole retained to the rotating plate and a guiding groove engaging with the guiding pole, the guiding groove is defined in the retaining plate and is located at an inner side of the curved cut-out, the guiding groove comprises a first guiding groove end away from the cut-out and an opposite second guiding groove end adjacent to the cut-out; a distance between the first guiding groove end and the first cut-out end is equal to a distance between the second guiding groove end and the second cut-out end; when the rotating plate rotates relative to the retaining plate from a first position to a third position, the guiding pole slides from the first guiding groove end to the second guiding groove end with the pin sliding along the cut-out from the first cut-out end to the second cut-out end.

2. The rotating mechanism claimed in claim 1, wherein the guiding pole is retained in a securing hole defined in the rotating plate, and a distal end of the guiding pole is wider than the guiding groove to retain the rotating plate to the retaining plate.

3. The rotating mechanism claimed in claim 1, further comprising a biasing member which includes a first biasing member end and a second biasing member end, wherein the first biasing member end is retained on the pin and the second biasing member end is retained on the shaft; when the rotating plate rotates from the first position to an intermediate position, the biasing member is compressed by the pin to exert a force on the rotating plate and the retaining plate causing the rotating plate to automatically rotate toward then third position once the rotating plate passes the intermediate position.

4. The rotating mechanism claimed in claim 3, wherein the first biasing member end defines a first latching hole, and the pin inserts through the first latching hole so the first biasing member end retains to the pin.

5. The rotating mechanism claimed in claim 4, wherein the second biasing member end defines a second latching hole, the retaining plate defines a shaft hole; the shaft is inserted in the second latching hole and the shaft hole so the second biasing member end is retained to the retaining plate.

6. The rotating mechanism claimed in claim 5, wherein the shaft hole is spaced apart from the cut-out, a distance between the shaft hole and the first cut-out end is equal to a distance between the shaft hole and the second cut-out end.

7. An electronic device, comprising:
    an upper housing;
    a lower housing; and
    a rotating mechanism comprising:
        a retaining plate mounted to the lower housing, the retaining plate having a curved cut-out defined therethrough, the cut-out comprising a first cut-out end and an opposite second cut-out end;

a rotating plate mounted to the upper housing, the rotating plate being capable of rotating in a plane parallel to the plane of the retaining plate by a shaft;

a pin slidably engaging with the cut-out and retained on the rotating plate;

a guiding assembly coupled between the rotating plate and the retaining plate to guide the rotating plate to rotate relative to the retaining plate;

wherein the guiding assembly comprises a guiding pole retained to the rotating plate and a guiding groove engaging with the guiding pole, the guiding groove is defined in the retaining plate and is located at an inner side of the curved cut-out, the guiding groove comprises a first guiding groove end away from the cut-out and an opposite second guiding groove end adjacent to the cut-out; a distance between the first guiding groove end and the first cut-out end is equal to a distance between the second guiding groove end and the second cut-out end; when the rotating plate rotates relative to the retaining plate from a first position to a third position, the guiding pole slides from the first guiding groove end to the second guiding groove end with the pin sliding along the cut-out from the first cut-out end to the second cut-out end.

8. The electronic device claimed in claim 7, wherein the guiding pole is retained in a securing hole defined in the rotating plate, and a distal end of the guiding pole is wider than the guiding groove to retain the rotating plate to the retaining plate.

9. The electronic device claimed in claim 7, further comprising a biasing member which includes a first biasing member end and a second biasing member end, wherein the first biasing member end is retained on the pin and the second biasing member end is retained on the retaining plate; when the rotating plate rotates from the first position to an intermediate position, the biasing member is compressed by the pin to exert a force on the rotating plate and the retaining plate causing the rotating plate to automatically rotate toward then third position once the rotating plate passes the intermediate position.

10. The electronic device claimed in claim 9, wherein the first biasing member end defines a first latching hole, and the pin inserts through the first latching hole so the first biasing member end retains to the pin.

11. The electronic device claimed in claim 10, wherein the second biasing member end defines a second latching hole, the retaining plate defines a shaft hole; the shaft is inserted in the second latching hole and the shaft hole so the second biasing member end is retained to the retaining plate.

* * * * *